(12) United States Patent
Choi

(10) Patent No.: US 10,929,541 B2
(45) Date of Patent: Feb. 23, 2021

(54) APPARATUS AND METHOD FOR ASSESSING CYBERSECURITY VULNERABILITIES BASED ON SERIAL PORT

(71) Applicant: ELECTRONICS AND TELECOMMUNICATIONS RESEARCH INSTITUTE, Daejeon (KR)

(72) Inventor: Yang-Seo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 296 days.

(21) Appl. No.: 16/041,974

(22) Filed: Jul. 23, 2018

(65) Prior Publication Data

US 2019/0050578 A1    Feb. 14, 2019

(30) Foreign Application Priority Data

Aug. 10, 2017    (KR) .......................... 10-2017-0101667

(51) Int. Cl.
*G06F 21/57*    (2013.01)
*G06F 21/53*    (2013.01)
(Continued)

(52) U.S. Cl.
CPC ............ *G06F 21/577* (2013.01); *G06F 16/23* (2019.01); *G06F 21/53* (2013.01); *G06F 21/85* (2013.01);
(Continued)

(58) Field of Classification Search
CPC ........ G06F 21/577; G06F 16/23; G06F 21/53; G06F 21/85; G06F 2221/034; G06F 2221/2149
See application file for complete search history.

(56) References Cited

U.S. PATENT DOCUMENTS 8,490,188 B2 *  7/2013  Kandek ................. H04L 63/166
                                                                  726/22
9,009,837 B2 *  4/2015  Nunez Di Croce .. G06F 21/577
                                                                  726/25
(Continued)

FOREIGN PATENT DOCUMENTS

KR            10-1210027 B1    12/2012
KR       10-2013-0023637 A      3/2013
(Continued)

*Primary Examiner* — Joseph P Hirl
*Assistant Examiner* — Stephen T Gundry
(74) *Attorney, Agent, or Firm* — LRK Patent Law Firm

(57) ABSTRACT

An apparatus and method for assessing cybersecurity vulnerabilities based on a serial port. The apparatus includes a vulnerability DB for storing vulnerability assessment items, a communication unit for configuring an environment for serial communication with an assessment target device and configuring a network environment, a vulnerability scanning unit for selecting a vulnerability assessment item for which cybersecurity vulnerability assessment is to be performed on the assessment target device, and performing scanning for checking the selected vulnerability assessment item on the assessment target device, a response analysis unit for analyzing a response of the assessment target device to the scanning, and setting one or more of an operating system, an application, and a protocol corresponding to the assessment target device, and a vulnerability presence determination unit for determining, using the set one or more of the operating system, application, and protocol, whether a vulnerability is present.

20 Claims, 8 Drawing Sheets

(51) Int. Cl.
*G06F 16/23* (2019.01)
*G06F 21/85* (2013.01)
(52) U.S. Cl.
CPC .............. *G06F 2221/034* (2013.01); *G06F 2221/2149* (2013.01)

(56) References Cited

U.S. PATENT DOCUMENTS

| | | | | |
|---|---|---|---|---|
| 9,021,587 | B2* | 4/2015 | Goel | G06F 21/577 714/1 |
| 9,130,983 | B2 | 9/2015 | Heo et al. | |
| 10,380,348 | B2* | 8/2019 | Cheng | H04L 63/1425 |
| 2005/0005169 | A1* | 1/2005 | Kelekar | G06F 9/542 726/4 |
| 2010/0175135 | A1* | 7/2010 | Kandek | G06F 21/577 726/25 |
| 2013/0174263 | A1* | 7/2013 | Nunez Di Croce | G06F 16/951 726/25 |
| 2014/0137257 | A1* | 5/2014 | Martinez | H04L 63/1433 726/25 |
| 2014/0351940 | A1* | 11/2014 | Loder | G06F 9/45558 726/25 |
| 2015/0033348 | A1* | 1/2015 | Oliphant | G06F 21/577 726/25 |
| 2015/0033353 | A1* | 1/2015 | Oliphant | G06F 21/577 726/25 |
| 2015/0040230 | A1* | 2/2015 | Oliphant | H04L 63/20 726/25 |
| 2015/0040231 | A1* | 2/2015 | Oliphant | G06F 21/57 726/25 |
| 2015/0040233 | A1* | 2/2015 | Oliphant | H04L 63/1441 726/25 |
| 2015/0237063 | A1* | 8/2015 | Cotton | G06F 21/577 726/25 |
| 2016/0099963 | A1* | 4/2016 | Mahaffey | H04L 63/0227 726/25 |
| 2016/0232358 | A1* | 8/2016 | Grieco | G06F 21/577 |
| 2016/0241582 | A1* | 8/2016 | Boia | H04L 63/1433 |
| 2017/0103215 | A1* | 4/2017 | Mahaffey | H04L 63/1425 |
| 2017/0329783 | A1* | 11/2017 | Singh | G06F 16/24578 |
| 2018/0144139 | A1* | 5/2018 | Cheng | G06F 21/577 |
| 2018/0191766 | A1* | 7/2018 | Holeman | G06F 21/6245 |
| 2018/0198801 | A1* | 7/2018 | Gopalakrishna | H04L 63/1491 |
| 2020/0042720 | A1* | 2/2020 | Rebelo | G06F 21/554 |

FOREIGN PATENT DOCUMENTS

| | | |
|---|---|---|
| KR | 10-1359378 B1 | 2/2014 |
| KR | 10-1378057 B1 | 3/2014 |
| KR | 10-2014-0118494 A | 10/2014 |
| KR | 10-1744631 B1 | 6/2017 |

* cited by examiner

| Ordi.. | Function | Direct... | Data P... | Status |
|---|---|---|---|---|
| 247 | IRP_MJ_DEVICE_CONTROL (IOCT... | DOWN | TRUE | 0X0 |
| 248 | IRP_MJ_DEVICE_CONTROL (IOCT... | UP | FALSE | 0X0 |
| 249 | IRP_MJ_DEVICE_CONTROL (IOCT... | DOWN | TRUE | 0X0 |
| 250 | IRP_MJ_DEVICE_CONTROL (IOCT... | UP | FALSE | 0X0 |
| 251 | IRP_MJ_DEVICE_CONTROL (IOCT... | DOWN | TRUE | 0X0 |
| 252 | IRP_MJ_READ | UP | FALSE | 0Xc0000 |
| 253 | IRP_MJ_DEVICE_CONTROL (IOCTL_... | UP | FALSE | 0X0 |
| 254 | IRP_MJ_DEVICE_CONTROL (IOCTL_... | DOWN | TRUE | 0X0 |
| 255 | IRP_MJ_DEVICE_CONTROL (IOCTL_... | UP | FALSE | 0X0 |
| 256 | IRP_MJ_DEVICE_CONTROL (IOCTL_... | DOWN | FALSE | 0X0 |
| 257 | IRP_MJ_DEVICE_CONTROL (IOCTL_... | UP | TRUE | 0X0 |
| 258 | IRP_MJ_CLOSE | DOWN | FALSE | 0X0 |
| 259 | IRP_MJ_CLOSE | UP | FALSE | 0X0 |

FIG. 7

APPARATUS AND METHOD FOR ASSESSING CYBERSECURITY VULNERABILITIES BASED ON SERIAL PORT

CROSS REFERENCE TO RELATED APPLICATION

This application claims the benefit of Korean Patent Application No. 10-2017-0101667, filed Aug. 10, 2017, which is hereby incorporated by reference in its entirety into this application.

BACKGROUND OF THE INVENTION

1. Technical Field

The present invention relates to technology for assessing cybersecurity vulnerabilities in a system operated in an environment in which it is impossible to assess vulnerabilities in a typical network environment based on Transmission Control Protocol/Internet Protocol (TCP/IP).

2. Description of the Related Art

All vulnerability assessment tools that are currently released and used are network-based vulnerability assessment tools and are operated over network protocols, such as Internet Protocol/Transmission Control Protocol/User Datagram Protocol (IP/TCP/UDP). That is, the vulnerability assessment tools assess vulnerabilities in systems having Internet Protocol (IP) addresses and present the results of assessment from a remote place over a network.

However, in a special network environment, such as for an industrial control network, a Supervisory Control and Data Acquisition (SCADA) network, and a power grid, rather than in a typical network environment, protocols differing from those used in an IP network are used, or bidirectional communication is impossible, and thus some systems from which it is difficult to collect information are operated. Here, the impossibility of bidirectional communication includes the implementation of a scheme in which networks are classified into respective levels by applying a unidirectional gateway or the like to guarantee the security of a specific system and in which only unidirectional communication is allowed between systems having different levels.

The above-described background technology is technological information that was possessed by the present applicant to devise the present invention or that was acquired by the present applicant during the course of devising the present invention, and thus such information cannot be construed to be known technology that was open to the public before the filing of the present invention.

PRIOR ART DOCUMENTS

Patent Documents (Patent Document 1) Korean Patent No. 10-1744631

SUMMARY OF THE INVENTION

Accordingly, the present invention has been made keeping in mind the above problems occurring in the prior art, and an object of the present invention is to provide an apparatus and method for assessing vulnerabilities in an assessment target device operated in a typical industrial control network or the like by utilizing a serial port provided by default on the assessment target device.

In accordance with an aspect of the present invention to accomplish the above object, there is provided an apparatus for assessing cybersecurity vulnerabilities based on a serial port, including a vulnerability database (DB) for storing vulnerability assessment items; a communication unit for configuring an environment for serial communication with an assessment target device and configuring a network environment for update of the vulnerability DB and system management; a vulnerability scanning unit for selecting a vulnerability assessment item for which cybersecurity vulnerability assessment is to be performed on the assessment target device, from among the vulnerability assessment items stored in the vulnerability DB, and for performing scanning for checking the selected vulnerability assessment item on the assessment target device connected thereto through a serial port; a response analysis unit for analyzing a response of the assessment target device to the scanning, and setting one or more of an operating system, an application, and a protocol corresponding to the assessment target device; and a vulnerability presence determination unit for determining, using the set one or more of the operating system, the application, and the protocol, whether a vulnerability is present in the assessment target device.

The assessment target device may be a device configured in a network environment in which bidirectional communication is limited, thus preventing a vulnerability from being assessed over a network.

The selected vulnerability assessment item may include one or more of network access environment information, response delay time information, banner information, payload information, and network protocol information.

The selected vulnerability assessment item may include one of a set of all vulnerability assessment items stored in the vulnerability DB, a recommended vulnerability assessment item, and a selected vulnerability assessment item entered by a user.

The response analysis unit may analyze the response using one or more of a banner information analysis function, a response delay time analysis function, and a response payload analysis function.

The apparatus may further include a DB management unit for updating and managing the vulnerability assessment items stored in the vulnerability DB.

The DB management unit may be configured to compare vulnerability assessment items stored in an external vulnerability DB with the vulnerability assessment items stored in the vulnerability DB and to update the vulnerability DB with a new vulnerability assessment item that is not stored in the vulnerability DB.

The apparatus may further include a result report creation unit for creating a vulnerability assessment result report based on the vulnerability assessment, wherein the vulnerability DB may further store the vulnerability assessment result report.

The vulnerability scanning unit may read the selected vulnerability assessment item from memory that reads the selected vulnerability assessment item from the vulnerability DB and temporarily stores the selected vulnerability assessment item.

The communication unit may configure a serial communication environment by setting a serial communication parameter for serial communication with the assessment target device, and the serial communication parameter may be used for vulnerability assessment by the apparatus for assessing cybersecurity vulnerabilities.

In accordance with another aspect of the present invention to accomplish the above object, there is provided a method for assessing cybersecurity vulnerabilities based on a serial port, including selecting a vulnerability assessment item for which cybersecurity vulnerability assessment is to be performed on an assessment target device, from among vulnerability assessment items stored in a vulnerability database (DB); configuring a serial communication environment with the assessment target device; configuring a network environment for update of the vulnerability DB and system management; performing scanning for checking the selected vulnerability assessment item on the assessment target device connected through a serial port; setting one or more of an operating system, an application, and a protocol corresponding to the assessment target device by analyzing a response of the assessment target device to the scanning; and determining, using the set one or more of the operating system, the application, and the protocol, whether a vulnerability is present in the assessment target device.

The assessment target device may be a device configured in a network environment in which bidirectional communication is limited, thus preventing a vulnerability from being assessed over a network.

The selected vulnerability assessment item may include one or more of network access environment information, response delay time information, banner information, payload information, and network protocol information.

The selected vulnerability assessment item may include one of a set of all vulnerability assessment items stored in the vulnerability DB, a recommended vulnerability assessment item, and a selected vulnerability assessment item entered by a user.

Setting one or more of the operating system, the application, and the protocol may be configured to analyze the response using one or more of a banner information analysis function, a response delay time analysis function, and a response payload analysis function.

The method may further include updating and managing the vulnerability assessment items stored in the vulnerability DB.

Updating and managing the vulnerability assessment items may be configured to compare vulnerability assessment items stored in an external vulnerability DB with the vulnerability assessment items stored in the vulnerability DB and to update the vulnerability DB with a new vulnerability assessment item that is not stored in the vulnerability DB.

The method may further include creating a vulnerability assessment result report based on the vulnerability assessment; and storing the vulnerability assessment result report in the vulnerability DB.

Performing the scanning may be configured to read the selected vulnerability assessment item from memory that reads the selected vulnerability assessment item from the vulnerability DB and temporarily stores the selected vulnerability assessment item.

Configuring the network environment may be configured to configure a serial communication environment by setting a serial communication parameter for serial communication with the assessment target device, and the serial communication parameter may be used for vulnerability assessment by the apparatus for assessing cybersecurity vulnerabilities.

BRIEF DESCRIPTION OF THE DRAWINGS

The above and other objects, features and advantages of the present invention will be more clearly understood from the following detailed description taken in conjunction with the accompanying drawings, in which:

FIGS. 5 to 8 are diagrams illustrating results of monitoring serial communication content according to an embodiment of the present invention.

DESCRIPTION OF THE PREFERRED EMBODIMENTS

Figure 1:
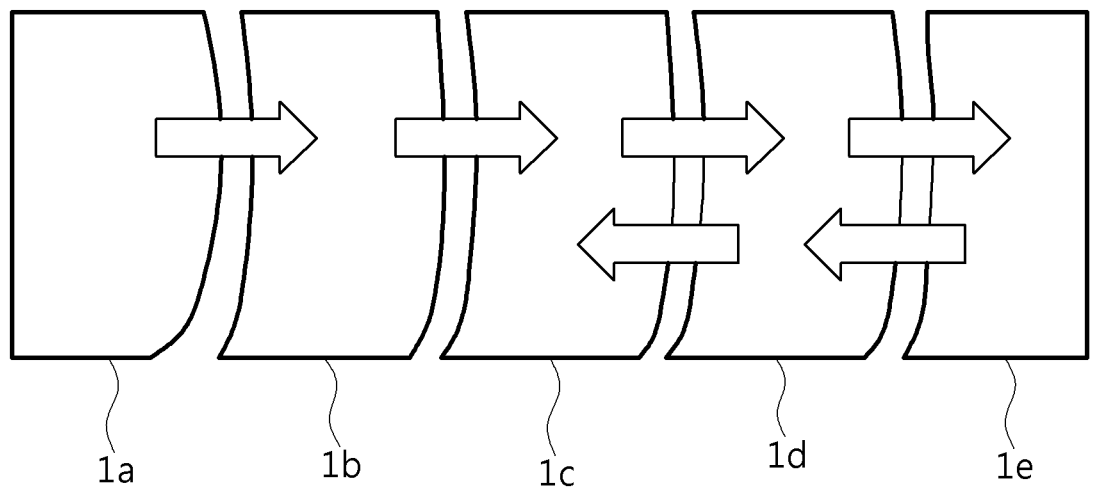
FIG. 1 is a diagram conceptually illustrating in-depth defense applied to a system to which an apparatus for assessing cybersecurity vulnerabilities based on a serial port according to an embodiment of the present invention is applicable.

The present invention may be variously changed, and may have various embodiments, and specific embodiments will be described in detail below with reference to the attached drawings. The advantages and features of the present invention and methods for achieving them will be more clearly understood from the following detailed description taken in conjunction with the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

However, the present invention is not limited to the following embodiments, and some or all of the following embodiments can be selectively combined and configured so that various modifications are possible. In the following embodiments, terms such as "first" and "second" are not intended to restrict the meanings of components, and are merely intended to distinguish one component from other components. A singular expression includes a plural expression unless a description to the contrary is specifically pointed out in context. In the present specification, it should be understood that terms such as "include" or "have" are merely intended to indicate that features or components described in the present specification are present, and are not intended to exclude the possibility that one or more other features or components will be present or added.

Embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a diagram conceptually illustrating in-depth defense applied to a system to which an apparatus for assessing cybersecurity vulnerabilities based on a serial port according to an embodiment of the present invention is applicable.

Referring to FIG. 1, the concept of in-depth defense is applied to nuclear power plants, and whether to perform bidirectional communication or unidirectional communication with other security-level layers is decided depending on the preset security level.

Level-4 layer 1a enables only unidirectional communication with level-3 layer 1b, the level-3 layer 1b enables only unidirectional communication with level-2 layer 1c, the level-2 layer 1c enables bidirectional communication with level-1 layer 1d, and the level-1 layer 1d enables bidirectional communication with level-0 layer 1e.

That is, since respective security-level layers use directional communication channels or lines in response to security requests, it is difficult to assess vulnerabilities based on a typical network.

Figure 2:
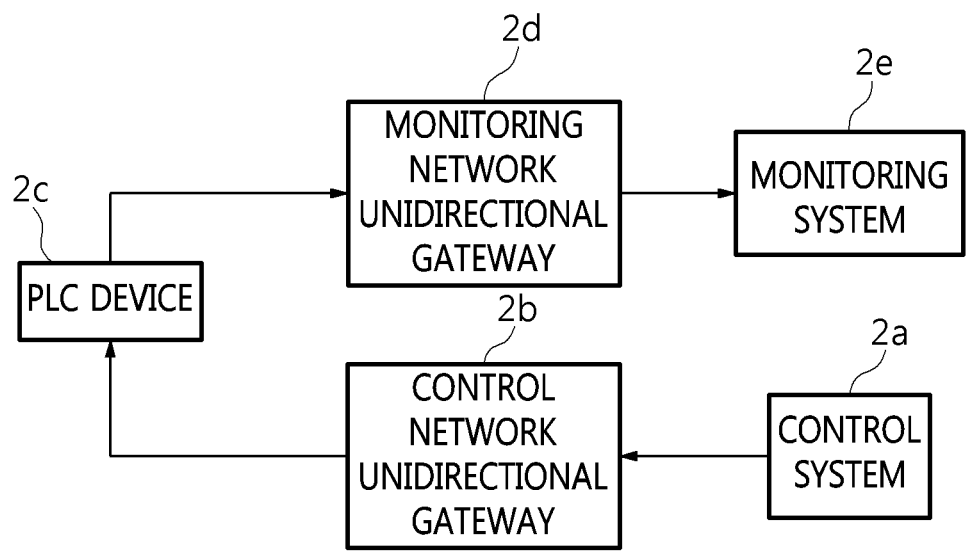
FIG. 2 is a diagram illustrating an example of a system to which an apparatus for assessing cybersecurity vulnerabilities based on a serial port according to an embodiment of the present invention is applicable.

FIG. 2 is a diagram illustrating an example of a system to which an apparatus for assessing cybersecurity vulnerabilities based on a serial port according to an embodiment of the present invention is applicable.

Even if the overall networks and systems are configured and operated in the form of FIG. 1, an operator who operates the systems fundamentally needs to control a system which is present in a level-4 layer (see 1a in FIG. 1) and to check the results of the control. Therefore, in an operation environment in which only unidirectional communication with other security-level layers is possible, such as for the level-4 layer (see 1a in FIG. 1), the networks and systems may be configured in a form such as that illustrated in FIG. 2.

Referring to FIG. 2, a control system 2a transfers a control command to a Programmable Logic Controller (PLC) device (control target device) 2c through a control network unidirectional gateway 2b for supporting only unidirectional communication, and a monitoring system 2e may check the status and control results of the control target device 2c through a monitoring network unidirectional gateway 2d which supports only unidirectional communication.

Although the system illustrated in FIG. 2 is depicted in a very simple form, the system may be actually operated such that additional security functions are implemented in order to more securely operate the networks.

In this environment, when a server or system belonging to the control system 2a is subjected to an attack using any method, it is impossible to know whether the attack has succeeded or failed, but if specific vulnerabilities are present in the PLC device and the control network unidirectional gateway, an attack on the PLC device may be made.

That is, even if security is improved through the configuration of a unidirectional network in this way, it is not entirely impossible to attack the PLC device, and thus vulnerabilities in the PLC device must be continuously assessed. In a network configured in the form shown in FIG. 2, it is impractical to assess vulnerabilities using a typical vulnerability assessment tool that is operating based on IP/TCP/UDP from a remote place. Accordingly, it may be effective to assess vulnerabilities using the apparatus for assessing cybersecurity vulnerabilities based on a serial port according to the embodiment of the present invention.

However, when vulnerabilities are assessed using a serial port, not all connectable systems can be assessed from one place, as in the case of an existing vulnerability assessment tool, and a system on which the vulnerability assessment tool is executed must be connected to an assessment target device through the serial port, and thus 1:1 vulnerability assessment must be inevitably performed. However, unless the scheme provided according to the present invention is used, a supervisor must personally access an assessment target system, check the versions of service to be provided and the operating system (OS) in use, and manually scan for and identify vulnerabilities on corresponding versions, thus greatly increasing the time required to assess vulnerabilities. Therefore, the present invention, which is capable of solving the problem in which an assessment time is excessively long, thus making it impractical to assess vulnerabilities, is considered meaningful.

Figure 3:
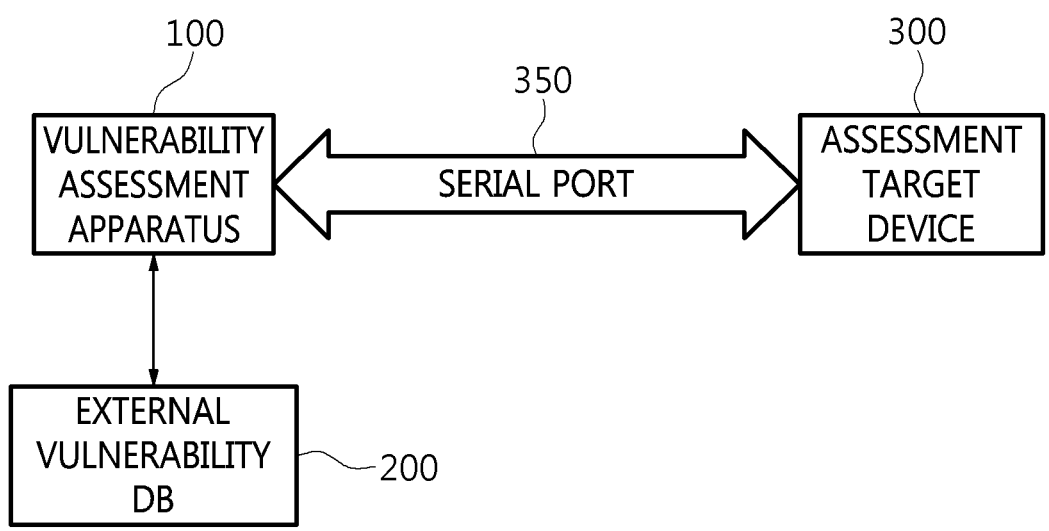
FIG. 3 is a block diagram illustrating the configuration of a system for assessing cybersecurity vulnerabilities based on a serial port according to an embodiment of the present invention.

FIG. 3 is a block diagram illustrating the configuration of a system 3 for assessing cybersecurity vulnerabilities based on a serial port according to an embodiment of the present invention.

Referring to FIG. 3, in the system 3 for assessing cybersecurity vulnerabilities based on a serial port according to the embodiment of the present invention, an apparatus 100 for assessing cybersecurity vulnerabilities based on a serial port (hereinafter also referred to as "vulnerability assessment apparatus 100") is connected to an assessment target device 300 through a serial port 350, and the vulnerability assessment apparatus 100 is connected to an external vulnerability database (DB) 200.

The vulnerability assessment apparatus 100 according to the embodiment of the present invention is characterized in that vulnerability assessment items, for which vulnerability assessment is to be performed on the assessment target device 300 connected thereto through the serial port 350, are selected, and the assessment target device 300 is scanned for the selected vulnerability assessment items, and is further characterized in that responses to the scanning are received and analyzed, after which an operating system, an application, and a protocol corresponding to the assessment target device 300 are set, and it is determined, based on the set operating system, application, and protocol, whether there are vulnerabilities.

In a selective embodiment, the vulnerability assessment apparatus 100 may compare vulnerability assessment items stored in the external vulnerability DB 200 with vulnerability assessment items stored in an internal vulnerability DB (see 140 of FIG. 4), and may then update the internal vulnerability DB (see 140 of FIG. 4) with a new vulnerability assessment item when a new vulnerability assessment item is found to be present as a result of the comparison.

In a selective embodiment, the vulnerability assessment apparatus 100 may use the selected vulnerability assessment items, temporarily stored in memory (see 130 of FIG. 4), when scanning the assessment target device 300 to assess vulnerabilities.

That is, instead of directly reading vulnerability assessment items from the vulnerability DB (see 140 of FIG. 4), the selected vulnerability assessment items may be temporarily stored or loaded in the memory (see 130 of FIG. 4), and thus the vulnerability assessment items may be read more quickly.

Figure 4:
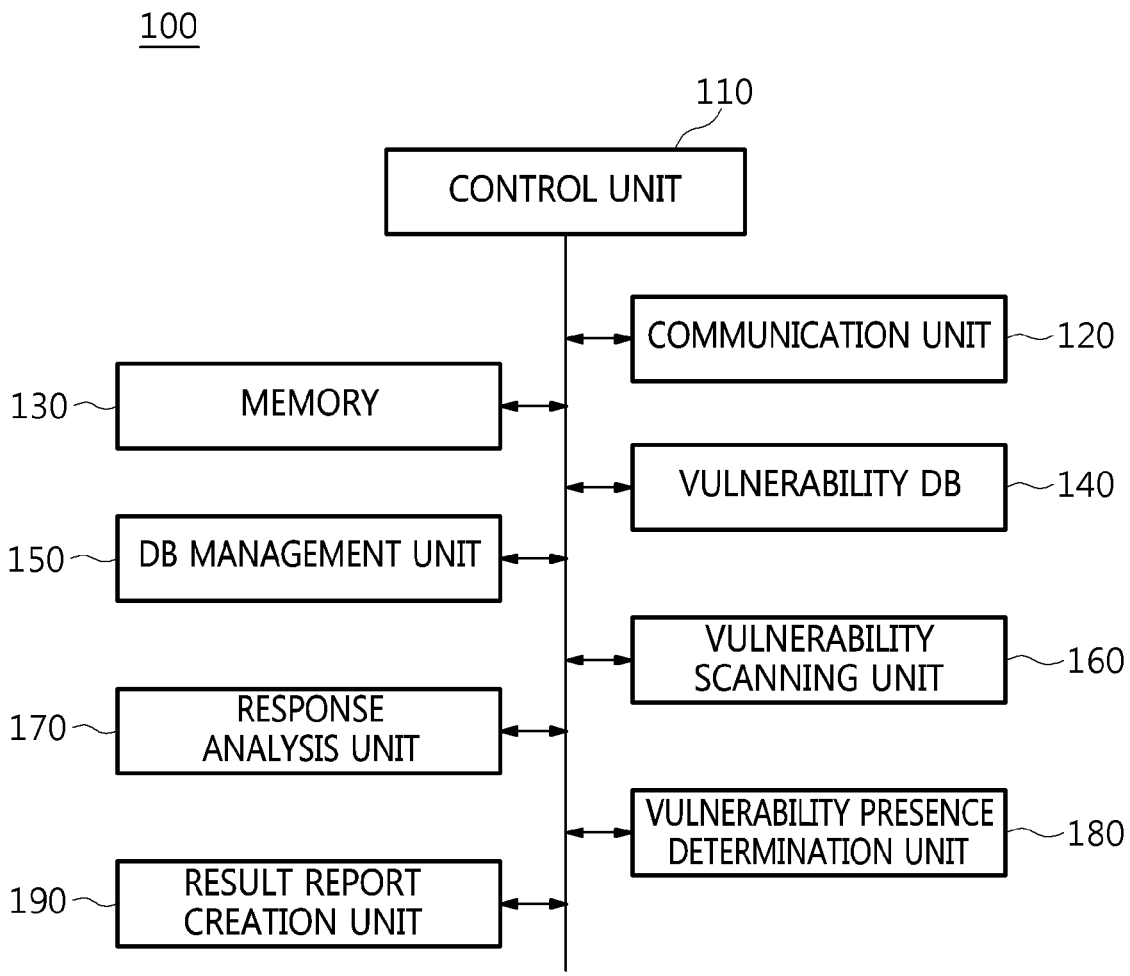
FIG. 4 is a block diagram illustrating an example of the apparatus for assessing cybersecurity vulnerabilities based on a serial port, illustrated in FIG. 3.
Figure 5:
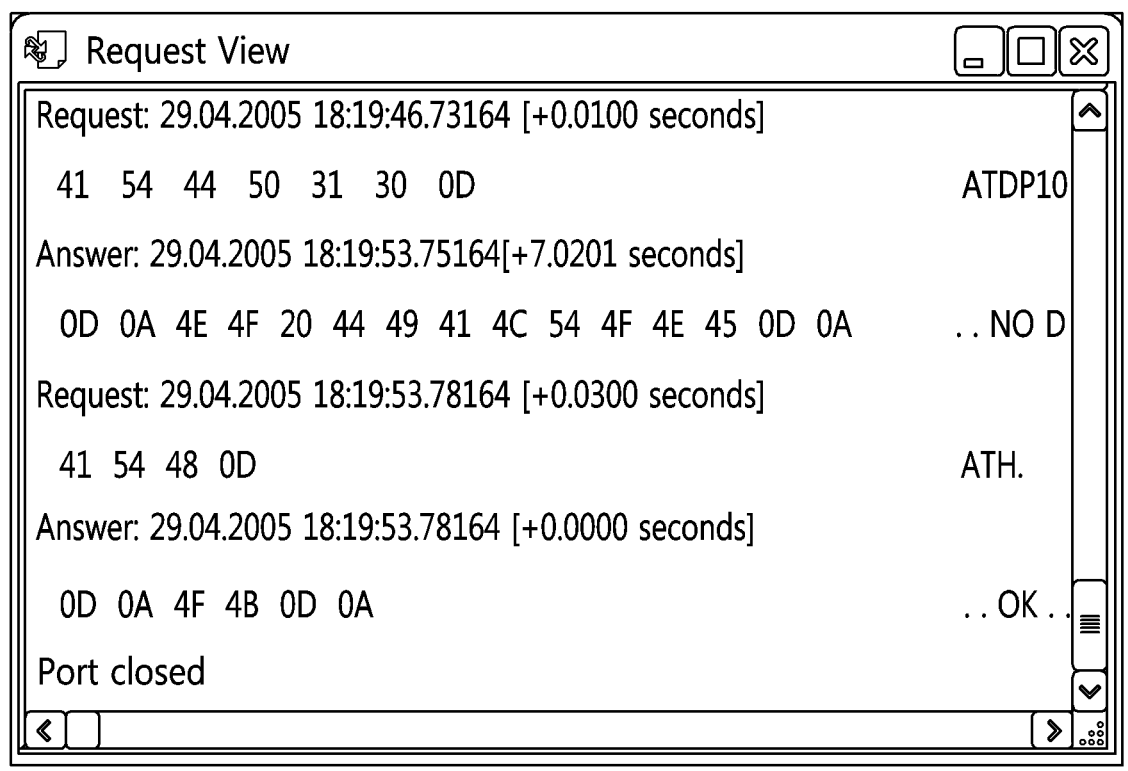
Figure 6:
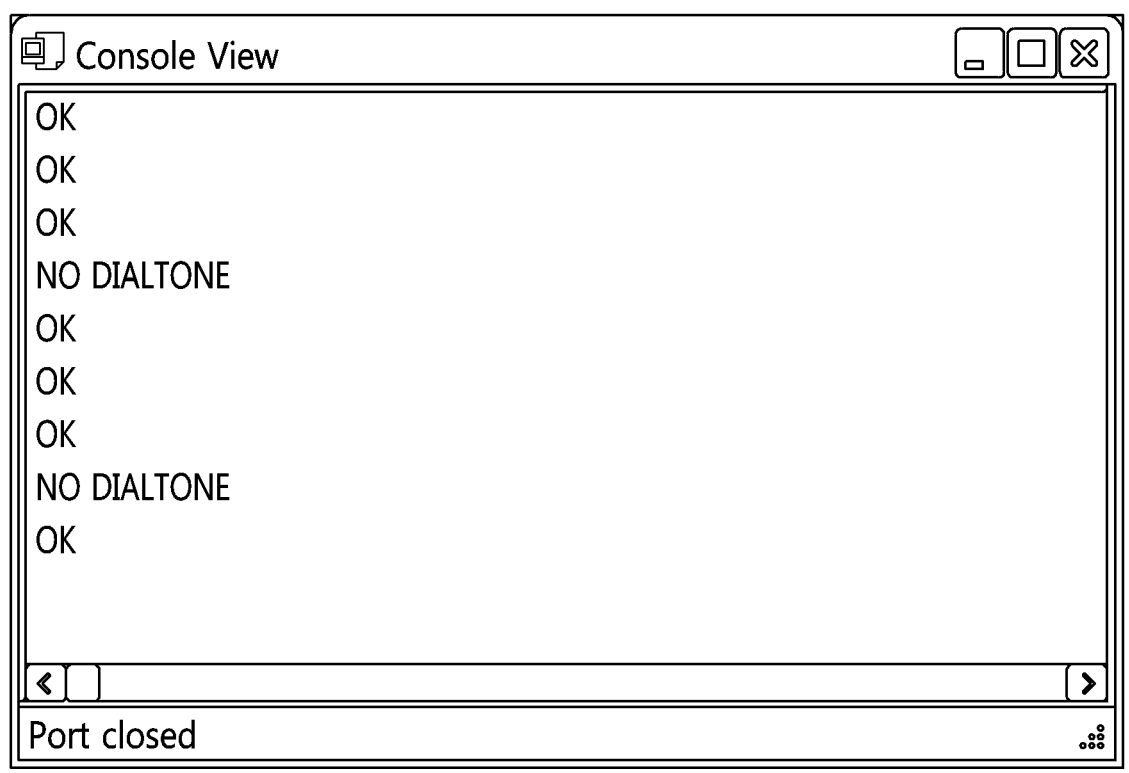
Figure 8:
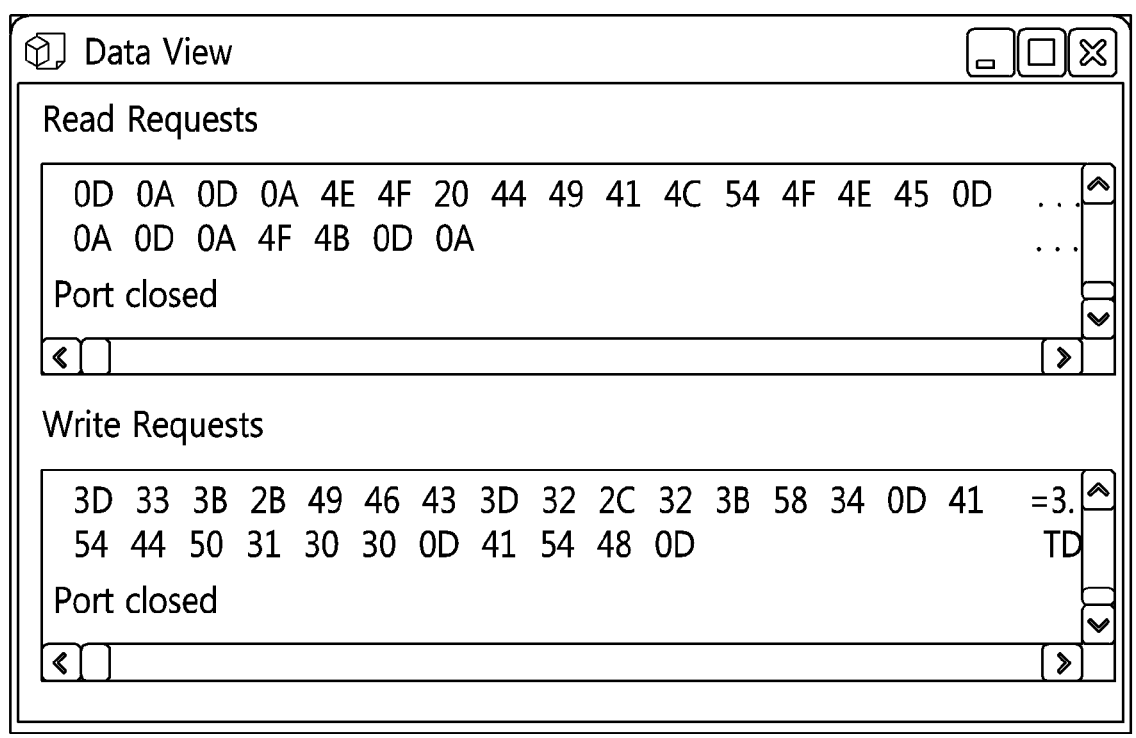

In a selective embodiment, the vulnerability assessment apparatus 100 may create assessment results from vulnerability assessment, and may store the created assessment results in the vulnerability DB (see 140 of FIG. 4).

In a selective embodiment, the vulnerability assessment apparatus 100 may create an assessment result report based on the vulnerability assessment results, and may also store the created result report in the vulnerability DB (see 140 of FIG. 4).

The created result report may be provided later to a user or a supervisor.

The external vulnerability DB 200 may be any of various Industrial Control System (ICS)-related and Supervisory Control and Data Acquisition (SCADA)-related vulnerability DBs provided by external institutions or security companies, or may be an ICS-related vulnerability list provided at a charge or free of charge.

The assessment target device 300 may refer to a target device or system on which vulnerability assessment is to be performed.

In particular, the assessment target device 300 may refer to a device or system located in an environment in which bidirectional communication is limited due to a requirement to maintain security, or in an environment in which typical network communication is limited.

The serial port 350 refers to a physical interface for serial communication by which information may be exchanged one bit at a time in a computer environment.

FIG. 4 is a block diagram illustrating an example of the apparatus 100 for assessing cybersecurity vulnerabilities based on a serial port, illustrated in FIG. 3.

The vulnerability assessment apparatus 100 according to an embodiment of the present invention, which is a device for performing vulnerability assessment on an assessment target device (see 300 of FIG. 3) using a serial port (see 350 of FIG. 3), may perform functions of collecting information about the assessment target device (see 300 of FIG. 3) through the serial port, collecting information about an operating system, an application in operation, and a network protocol in use, and presenting vulnerability information matching the corresponding information to a user. That is, the vulnerability assessment apparatus 100 may also perform vulnerability assessment on systems that are operated in forms differing from those of systems in an existing network environment, through the serial port.

Referring to FIG. 4, the vulnerability assessment apparatus 100 according to the embodiment of the present invention includes a control unit 110, a communication unit 120, memory 130, a vulnerability database (DB) 140, a DB management unit 150, a vulnerability scanning unit 160, a response analysis unit 170, a vulnerability presence determination unit 180, and a result report creation unit 190.

In detail, the control unit 110 is a kind of Central Processing Unit (CPU), and controls the overall process of vulnerability assessment on the assessment target device using the serial port. That is, the control unit 110 may provide various functions by controlling the DB management unit 150, the vulnerability scanning unit 160, the response analysis unit 170, the vulnerability presence determination unit 180, and the result report creation unit 190.

Here, the control unit 110 may include all types of devices capable of processing data, such as a processor. Here, the term "processor" may refer to a data-processing device that has a circuit physically structured to perform functions represented by code or instructions included in a program and that is embedded in hardware. In this way, examples of the data-processing device embedded in hardware may include, but are not limited to, processing devices such as a microprocessor, a Central Processing Unit (CPU), a processor core, a multiprocessor, an Application-Specific Integrated Circuit (ASIC), and a Field-Programmable Gate Array (FPGA).

The communication unit 120 provides a communication interface needed to transfer transmission/reception signals between the vulnerability assessment apparatus 100, an external vulnerability DB (see 200 of FIG. 3), and the assessment target device (see 300 of FIG. 3).

Here, the communication unit 120 may be a device that includes hardware and software needed to transmit and receive signals, such as control signals or data signals, to and from additional network devices through wired/wireless connection to the additional network devices.

In particular, the communication unit 120 may transmit and receive signals, such as control signals or data signals, to and from the assessment target device (see 300 of FIG. 3) through the serial port (see 350 of FIG. 3).

The communication unit 120 must configure an accurate serial communication environment with the assessment target device (see 300 of FIG. 3) because communication therebetween is impossible unless the configuration of the environment is accurately established.

For this, the communication unit 120 may include an automatic communication environment establishment function.

Parameter values used for communication environment establishment may be utilized for vulnerability assessment.

Further, the communication unit 120 may configure a network environment required for the update of the vulnerability DB 140 and system management.

Also, the communication unit 120 may transmit and receive signals, such as control signals or data signals, so that a remote device (not shown) can monitor and control the vulnerability assessment apparatus 100.

The memory 130 performs a function of temporarily or permanently storing data processed by the control unit 110. Here, the memory 130 may include, but is not limited to, magnetic storage media or flash storage media.

The memory 130 may read the selected vulnerability assessment items to be used by the vulnerability scanning unit 160 from the vulnerability DB 140, and may temporarily store the selected vulnerability assessment items, thus improving the speed of vulnerability assessment.

Here, the memory 130 may temporarily store the selected vulnerability assessment items, and may provide the same so that the selected vulnerability assessment items are used when the vulnerability presence determination unit 180 subsequently determines, using the collected information, whether vulnerabilities are present.

The vulnerability DB 140 stores various vulnerability assessment items, operating system (OS) information, application information, protocol information, vulnerability assessment results, etc.

Here, the vulnerability DB 140 may include, as the vulnerability assessment items, vulnerability assessment items for a safety system OS of a nuclear power plant, vulnerability assessment items for a non-safety OS of the nuclear power plant, and vulnerability assessment items for an Industrial Control System (ICS) and a Supervisory Control and Data Acquisition (SCADA) device.

The vulnerability DB 140 may add vulnerability assessment items, which are autonomously discovered thereby, to respective vulnerability assessment items, and may store the resulting vulnerability assessment items.

The vulnerability DB 140 may store the results of vulnerability assessment.

The vulnerability DB 140 may store result reports based on the results of vulnerability assessment.

Here, respective vulnerability assessment items use information differentiated from assessment items, which are used by existing vulnerability assessment programs. This function will be described in detail later.

The DB management unit 150 updates and manages the vulnerability assessment items stored in the vulnerability DB 140.

Here, the DB management unit 150 may compare the vulnerability assessment items contained in the external vulnerability DB (see 200 of FIG. 3) with vulnerability assessment items contained in the vulnerability DB 140, and may update the vulnerability DB 140 with a new vulnerability assessment item when the new vulnerability assessment item is found to be present as a result of the comparison.

Here, the external vulnerability DB (see 200 of FIG. 3) may be any of various ICS-related and SCADA-related vulnerability DBs provided by external institutions or security companies, or may be an ICS-related vulnerability list provided at a charge or free of charge. Such a vulnerability list may be acquired, and then the existing items contained in the vulnerability DB 140 may be updated with the acquired vulnerability list.

The DB management unit 150 may transmit and receive data to and from the external vulnerability DB (see 200 of FIG. 3) through the communication unit 120.

Here, the DB management unit 150 may transmit and receive data to and from the external vulnerability DB (see 200 of FIG. 3) using an Ethernet interface.

The DB management unit 150 may manage the vulnerability DB 140 so that vulnerability assessment items, autonomously discovered by the vulnerability assessment apparatus 100 through vulnerability assessment, are additionally stored in the vulnerability DB 140.

The DB management unit 150 may store assessment results or assessment result reports based on vulnerability assessment in the vulnerability DB 140.

The vulnerability scanning unit 160 attempts to access the assessment target device (see 300 of FIG. 3) connected through a serial port (see 350 of FIG. 3) interface in order to check vulnerability assessment items selected for the assessment target device (see 300 of FIG. 3).

Here, the vulnerability assessment items selected to be checked by the vulnerability scanning unit 160 may be all vulnerability assessment items stored in the vulnerability DB 140, recommended vulnerability assessment items provided by recommending preset important vulnerability assessment items, or vulnerability assessment items directly selected by the entry of the user.

That is, when the vulnerability scanning unit 160 performs scanning, it is possible to perform vulnerability assessment only on operating systems, applications, and network protocols that are related to details corresponding to the selected vulnerability assessment items, rather than performing vulnerability assessment for all arbitrary possibilities, thus minimizing a vulnerability assessment process.

Here, the vulnerability scanning unit 160 may scan for vulnerabilities using the selected vulnerability assessment items that are extracted from the vulnerability DB 140 and are temporarily stored in the memory 130.

The vulnerability scanning unit 160 may access the assessment target device using network protocols specified in the selected vulnerability assessment items, and may use various serial communication protocols.

Here, the vulnerability scanning unit 160 may check whether an operating system and an application corresponding to each selected vulnerability assessment item are present.

When the selected vulnerability assessment items are all vulnerability assessment items, the vulnerability scanning unit 160 may attempt a random access scheme in order to identify the operating system, network protocol and application of the assessment target device (see 300 of FIG. 3).

Here, the vulnerability assessment items used by the vulnerability scanning unit 160 may use information differentiated from information which is used in existing vulnerability assessment programs. The reason for this is that the present invention identifies vulnerabilities based on serial communication rather than based on the existing network environment.

Accordingly, the vulnerability scanning unit 160 may utilize network access environment information, response delay time information, banner information, payload (data) information, network protocol information, etc. to identify a specific operating system, application, and network protocol.

Here, the network access environment information may include data bits, synchronization bits (start/stop bits), parity bits, the Baud rate, etc.

The response delay time information may be utilized to define a specific operating system and a specific system because response delay times of serial communication are different from each other for respective assessment target devices.

The banner information may be information about readable data collected through serial communication, and a specific character string included in the banner information may be utilized to define a specific operating system and a specific application.

The payload information refers to a payload value of the response information of the assessment target device, which corresponds to a response request from a vulnerability assessment tool. By means of this payload information, when the vulnerability assessment tool requests a response from the assessment target device using specific data and the response from the assessment target device is reached, the operating system and the application that are operating may be identified.

The network protocol information may be used to identify which network protocol is used, and may include information about Modbus, Process Field Bus (Profibus), Controller Area Network (CAN), and CC-Link protocols.

The above-described pieces of information may not specify an operating system or an application as only a piece of information, but the pieces of information may be integrated and analyzed, and thus the corresponding operating system, application, and protocol may be found, and the presence or absence of vulnerabilities may be determined based on the found operating system, application, and protocol.

The response analysis unit 170 analyzes the responses of the assessment target device (see 300 of FIG. 3) transferred from the vulnerability scanning unit 160.

Here, the response analysis unit 170 may perform analysis on each response of the assessment target device (see 300 of FIG. 3) using a banner information analysis function, a response delay time analysis function, and a response payload analysis function.

FIGS. 5 to 8 are diagrams illustrating the results of monitoring of serial communication content according to an embodiment of the present invention.

Here, the banner information analysis function may extract human-readable characters from responses collected from the assessment target device (see 300 of FIG. 3), and may then estimate information related to the operating system, application and protocol that are currently used by the assessment target device by analyzing the extracted characters.

The response delay time analysis function may collect information about the time required for a response to a specific message to reach the vulnerability scanning unit 160 when the vulnerability scanning unit 160 sends the specific message to the assessment target device (see 300 of FIG. 3), and may collect and calculate response delay times for a plurality of responses.

The response payload analysis function may analyze responses to access requests, and may infer information about the corresponding application because different responses to access requests are generated depending on the application or firmware that is operating in serial communication.

The vulnerability presence determination unit 180 may finally set the operating system, application and protocol of the assessment target device (see 300 of FIG. 3) using the information received from the response analysis unit 170, and may determine whether vulnerabilities are present by comparing content in the vulnerability assessment items, based on the set results.

Here, the vulnerability presence determination unit 180 may store lists of the determined vulnerabilities as the vulnerability assessment results in the vulnerability DB 140.

The result report creation unit 190 may create a result report on the vulnerability assessment results after vulnerability assessment has been performed.

In this case, the vulnerability assessment results, based on which the report is created by the result report creation unit 190, may be provided to the user.

Accordingly, security vulnerability assessment may be performed using the serial port even on a system that is operating in an environment that cannot be accessed in a typical network environment.

Figure 9:
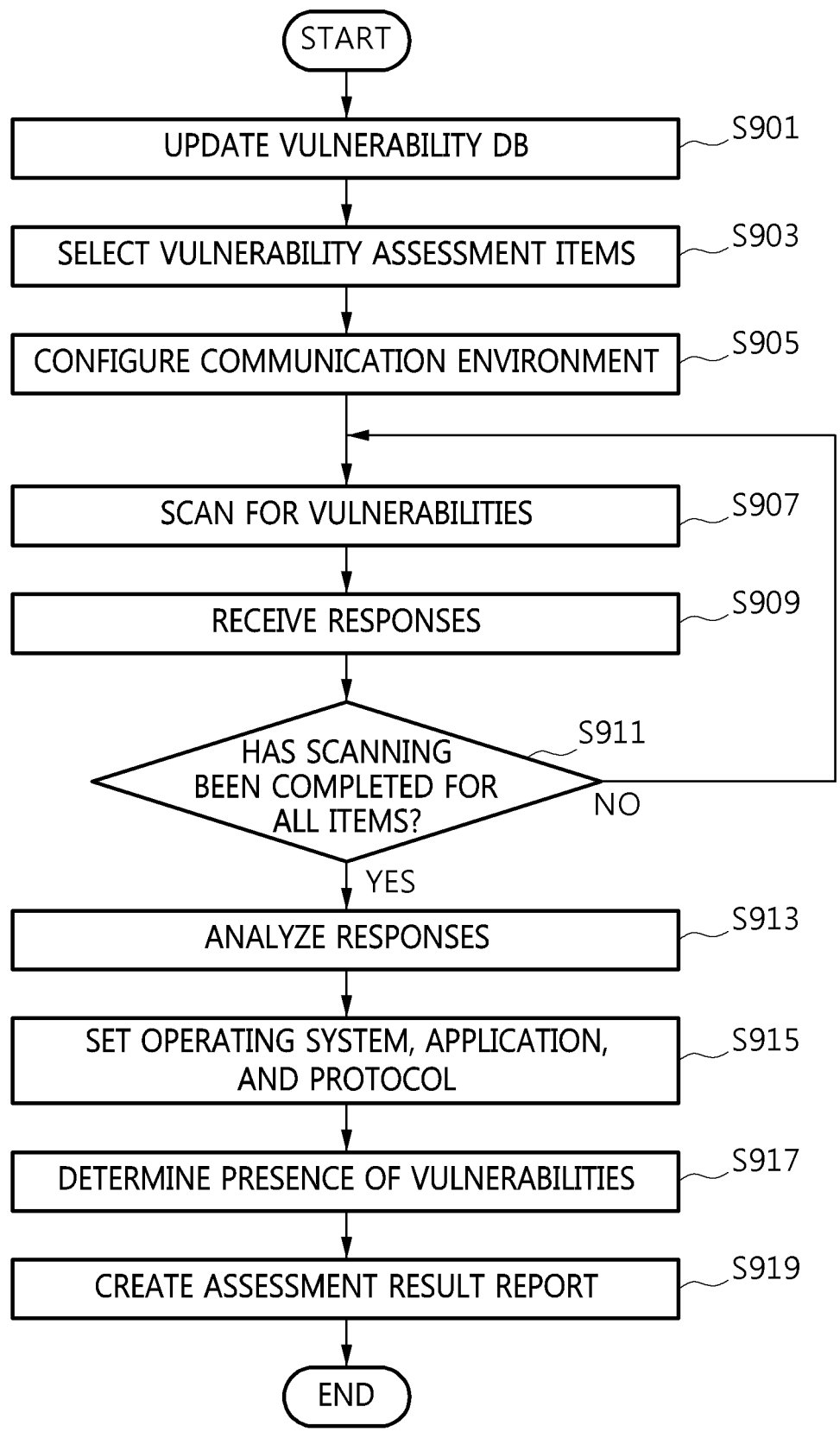
FIG. 9 is an operation flowchart illustrating a method for assessing cybersecurity vulnerabilities based on a serial port according to an embodiment of the present invention.

FIG. 9 is an operation flowchart illustrating a method for assessing cybersecurity vulnerabilities based on a serial port.

Referring to FIG. 9, in the method for assessing cybersecurity vulnerabilities based on a serial port according to the embodiment of the present invention, an apparatus (see 100 of FIG. 3) for assessing cybersecurity vulnerabilities based on a serial port updates a vulnerability DB (see 140 of FIG. 4) at step S901.

Here, when vulnerability assessment items contained in an external vulnerability DB (see 200 of FIG. 3) are compared with vulnerability assessment items contained in the vulnerability DB (see 140 of FIG. 4), and a new vulnerability assessment item is found to be present, the vulnerability DB (see 140 of FIG. 4) may be updated with the new vulnerability assessment item.

Here, the external vulnerability DB (see 200 of FIG. 3) may be any of various Industrial Control System (ICS)-related and Supervisory Control and Data Acquisition (SCADA)-related vulnerability DBs provided by external institutions or security companies, or may be an ICS-related vulnerability list provided at a charge or free of charge.

Next, in the method for assessing cybersecurity vulnerabilities based on a serial port according to the embodiment of the present invention, the vulnerability assessment apparatus (see 100 of FIG. 3) selects vulnerability assessment items for which vulnerability assessment is to be performed on the assessment target device (see 300 of FIG. 3) at step S903.

Here, the selected vulnerability assessment items may be all vulnerability assessment items stored in the vulnerability DB (see 140 of FIG. 4), recommended vulnerability assessment items provided by recommending preset important vulnerability assessment items, or vulnerability assessment items directly selected by the entry of the user.

Further, in the method for assessing cybersecurity vulnerabilities based on a serial port according to the embodiment of the present invention, the vulnerability assessment apparatus (see 100 of FIG. 3) configures a communication environment for serial communication with the assessment target device (see 300 of FIG. 3) at step S905.

Here, an automatic communication environment establishment function may be used to configure the communication environment.

Parameter values used for communication environment establishment may be utilized for vulnerability assessment.

Thereafter, in the method for assessing cybersecurity vulnerabilities based on a serial port according to the embodiment of the present invention, the vulnerability assessment apparatus (see 100 of FIG. 3) performs scanning so as to check the selected vulnerability assessment items on the assessment target device (see 300 of FIG. 3) connected thereto through a serial port (see 350 of FIG. 3) interface at step S907.

The selected vulnerability assessment items may be directly read from the vulnerability DB (see 140 of FIG. 4).

Here, the selected vulnerability assessment items may be read from items, which are temporarily stored in memory (see 130 of FIG. 4) after being read from the vulnerability DB (see 140 of FIG. 4).

The assessment target device may be accessed using network protocols specified in the selected vulnerability assessment items, and various serial communication protocols may be used.

Here, whether an operating system and an application corresponding to each selected vulnerability assessment item are present may be checked.

When the selected vulnerability assessment items are all vulnerability assessment items, a random access scheme may be attempted in order to identify the operating system, network protocol and application of the assessment target device (see 300 of FIG. 3).

Here, the vulnerability assessment items may use information differentiated from information which is used in existing vulnerability assessment programs. The reason for this is that the present invention identifies vulnerabilities based on serial communication rather than based on the existing network environment.

Accordingly, network access environment information, response delay time information, banner information, payload (data) information, network protocol information, etc. may be utilized to identify a specific operating system, application, and network protocol.

Next, in the method for assessing cybersecurity vulnerabilities based on a serial port according to the embodiment of the present invention, the vulnerability assessment apparatus (see 100 of FIG. 3) receives responses to the scanning from the assessment target device (see 300 of FIG. 3) at step S909.

Further, in the method for assessing cybersecurity vulnerabilities based on a serial port according to the embodiment of the present invention, the vulnerability assessment apparatus (see 100 of FIG. 3) determines whether scanning for all of the selected assessment target items has been completed at step S911.

If it is determined at step S911 that scanning for all of the selected assessment target items has not been completed, the process returns to step S907, and performs scanning on the assessment target device (see 300 of FIG. 3) for items which have not yet been scanned.

If it is determined at step S911 that scanning for all of the selected assessment target items has been completed, the responses to the scanning are analyzed at step S913.

Here, analysis may be performed on each response of the assessment target device (see 300 of FIG. 3) using a banner information analysis function, a response delay time analysis function, and a response payload analysis function.

Here, the banner information analysis function may extract human-readable characters from responses collected from the assessment target device (see 300 of FIG. 3), and may then estimate information related to the operating system, application, and protocol that are currently used by the assessment target device by analyzing the extracted characters.

The response delay time analysis function may collect information about the time required for a response to a specific message to be reached when the specific message is sent to the assessment target device (see 300 of FIG. 3), and may collect and calculate response delay times for a plurality of responses.

The response payload analysis function may analyze responses to access requests, and may infer information about the corresponding application because different responses to access requests are generated depending on the application or firmware that is operating in serial communication.

Next, in the method for assessing cybersecurity vulnerabilities based on a serial port according to the embodiment of the present invention, the vulnerability assessment apparatus (see 100 of FIG. 3) sets an operating system, an application, and a protocol corresponding to the assessment target device (see 300 of FIG. 3) using the results of analysis of the responses at step S915.

In the method for assessing cybersecurity vulnerabilities based on a serial port according to the embodiment of the present invention, the vulnerability assessment apparatus (see 100 of FIG. 3) determines whether vulnerabilities are present in the assessment target device based on the set operating system, application, and protocol at step S917.

In the method for assessing cybersecurity vulnerabilities based on a serial port according to the embodiment of the present invention, the vulnerability assessment apparatus (see 100 of FIG. 3) creates an assessment result report based on the results of vulnerability assessment at step S919.

The results of the vulnerability assessment may be stored in the vulnerability DB (see 140 of FIG. 4).

Here, the created assessment result report may be stored in the vulnerability DB (see 140 of FIG. 4).

Accordingly, security vulnerability assessment may be performed using a serial port even on systems that are operating in an environment that cannot be accessed in a typical network environment.

In a selective embodiment, among steps S901, S903, S905, S909, S911, S913, S915, S917, and S919, step S907 of scanning vulnerabilities and step S909 of receiving responses to scanning may be performed in parallel.

In a selective embodiment, among steps S901, S903, S905, S909, S911, S913, S915, S917, and S919, step S913 of analyzing the responses and step S915 of setting an operating system, an application, and a protocol may be performed in parallel.

Specific executions, described in the present invention, are only embodiments, and are not intended to limit the scope of the present invention using any methods. For the simplification of the present specification, a description of conventional electronic components, control systems, software, and other functional aspects of the systems may be omitted. Further, connections of lines between components shown in the drawings or connecting elements therefor illustratively show functional connections and/or physical or circuit connections. In actual devices, the connections may be represented by various functional connections, physical connections or circuit connections as replacements or additions thereto. Further, unless a definite expression, such as "essential" or "importantly" is specifically used in context, the corresponding component may not be an essential component for the application of the present invention.

In accordance with the present invention, the apparatus and method for assessing vulnerabilities using a serial port enable cybersecurity vulnerabilities to be assessed on an industrial control system (ICS), a SCADA system, or a power grid system, which cannot be assessed using existing vulnerability assessment tools because it is operating in an environment that cannot be accessed in a typical network environment (e.g. TCP/IP or the like).

As described above, the spirit of the present invention should not be defined by the above-described embodiments, and it will be apparent that the accompanying claims and equivalents thereof are included in the scope and spirit of the present invention.

What is claimed is:

1. An apparatus for assessing cybersecurity vulnerabilities based on a serial port, comprising:
   a vulnerability database (DB) for storing vulnerability assessment items;
   a communication unit for configuring an environment for serial communication with an assessment target device and configuring a network environment for update of the vulnerability DB and system management;
   one or more computer-executable units being configured and executed by a processor using algorithms associated with at least one non-transitory storage device, the algorithms, when executed, causing the processor to execute the one or more computer-executable units, the one or more computer-executable units comprising:
   a vulnerability scanning unit for selecting a vulnerability assessment item for which cybersecurity vulnerability assessment is to be performed on the assessment target device, from among the vulnerability assessment items stored in the vulnerability DB, and for performing scanning for checking the selected vulnerability assessment item on the assessment target device connected thereto through a serial port, wherein the vulnerability assessment is only performed on an operating system, application and network protocol that are related to details corresponding to the selected vulnerability assessment item;
   a response analysis unit for analyzing a response of the assessment target device to the scanning, and setting the operating system, the application, and the protocol corresponding to the assessment target device; and
   a vulnerability presence determination unit for determining, using the set of the operating system, the application, and the protocol, whether a vulnerability is present in the assessment target device.

2. The apparatus of claim 1, wherein the assessment target device is a device configured in a network environment in which bidirectional communication is limited.

3. The apparatus of claim 2, wherein the selected vulnerability assessment item comprises one or more of network access environment information, response delay time information, banner information, payload information, and network protocol information.

4. The apparatus of claim 3, wherein the selected vulnerability assessment item comprises one of a set of all vulnerability assessment items stored in the vulnerability DB, a recommended vulnerability assessment item, and a selected vulnerability assessment item entered by a user.

5. The apparatus of claim 4, wherein the response analysis unit analyzes the response using one or more of a banner information analysis function, a response delay time analysis function, and a response payload analysis function.

6. The apparatus of claim 5, further comprising a DB management unit for updating and managing the vulnerability assessment items stored the vulnerability DB.

7. The apparatus of claim 6, wherein the DB management unit is configured to compare vulnerability assessment items stored in an external vulnerability DB with the vulnerability assessment items stored in the vulnerability DB and to update the vulnerability DB with a new vulnerability assessment item that is not stored in the vulnerability DB.

8. The apparatus of claim 7, further comprising a result report creation unit for creating a vulnerability assessment result report based on the vulnerability assessment,
wherein the vulnerability DB further stores the vulnerability assessment result report.

9. The apparatus of claim 8, wherein the vulnerability scanning unit reads the selected vulnerability assessment item from memory that reads the selected vulnerability assessment item from the vulnerability DB and temporarily stores the selected, vulnerability assessment item.

10. The apparatus of claim 9, wherein:
the communication unit configures a serial communication environment by setting a serial communication parameter for serial communication with the assessment target device, and
the serial communication parameter is used for vulnerability assessment by the apparatus for assessing cybersecurity vulnerabilities.

11. A method for assessing cybersecurity vulnerabilities based on a serial port, comprising:
selecting a vulnerability assessment item for which cybersecurity vulnerability assessment is to be performed on an assessment target device, from among vulnerability assessment items stored in a vulnerability database (DB);
configuring a serial communication environment with the assessment target device;
configuring a network environment for update of the vulnerability DB and system management;
performing scanning for checking the selected vulnerability assessment item on the assessment target device connected through a serial port, wherein the vulnerability assessment is only performed on an operating system, application and network protocol that are related to details corresponding to the selected vulnerability assessment item;
setting the operating system, the application, and the protocol corresponding to the assessment target device by analyzing a response of the assessment target device to the scanning; and
determining, using the set of the operating system, the application, and the protocol, whether a vulnerability is present in the assessment target device.

12. The method of claim 11, wherein the assessment target device is a device configured in a network environment in which bidirectional communication is limited.

13. The method of claim 12, wherein the selected vulnerability assessment item comprises one or more of network access environment information, response delay time information, banner information, payload information, and network protocol information.

14. The method of claim 13, wherein the selected vulnerability assessment item comprises one of a set of all vulnerability assessment items stored in the vulnerability DB, a recommended vulnerability assessment item, and a selected vulnerability assessment item entered by a user.

15. The method of claim 14, wherein setting one or more of the operating system, the application, and the protocol is configured to analyze the response using one or more of a banner information analysis function, a response delay time analysis function, and a response payload analysis function.

16. The method of claim 15, further comprising updating and managing the vulnerability assessment items stored in the vulnerability DB.

17. The method of claim 16, wherein updating, and managing the vulnerability assessment items is configured to compare vulnerability assessment items stored in an external vulnerability DB with the vulnerability assessment items stored in the vulnerability DB and to update the vulnerability DB with a new vulnerability assessment item that is not stored in the vulnerability DB.

18. The method of claim 17, further comprising:
creating a vulnerability assessment result report based on the vulnerability assessment; and
storing the vulnerability assessment result report in the vulnerability DB.

19. The method of claim 18, wherein performing the scanning is configured to read the selected vulnerability assessment item from memory that reads the selected vulnerability assessment item from the vulnerability DB and temporarily stores the selected vulnerability assessment item.

20. The method of claim 19, wherein:
configuring the network environment is configured to configure a serial communication environment by setting a serial communication parameter for serial communication with the assessment target device, and
the serial communication parameter is used for vulnerability assessment by the apparatus for assessing cybersecurity vulnerabilities.

* * * * *